Patented Jan. 9, 1940

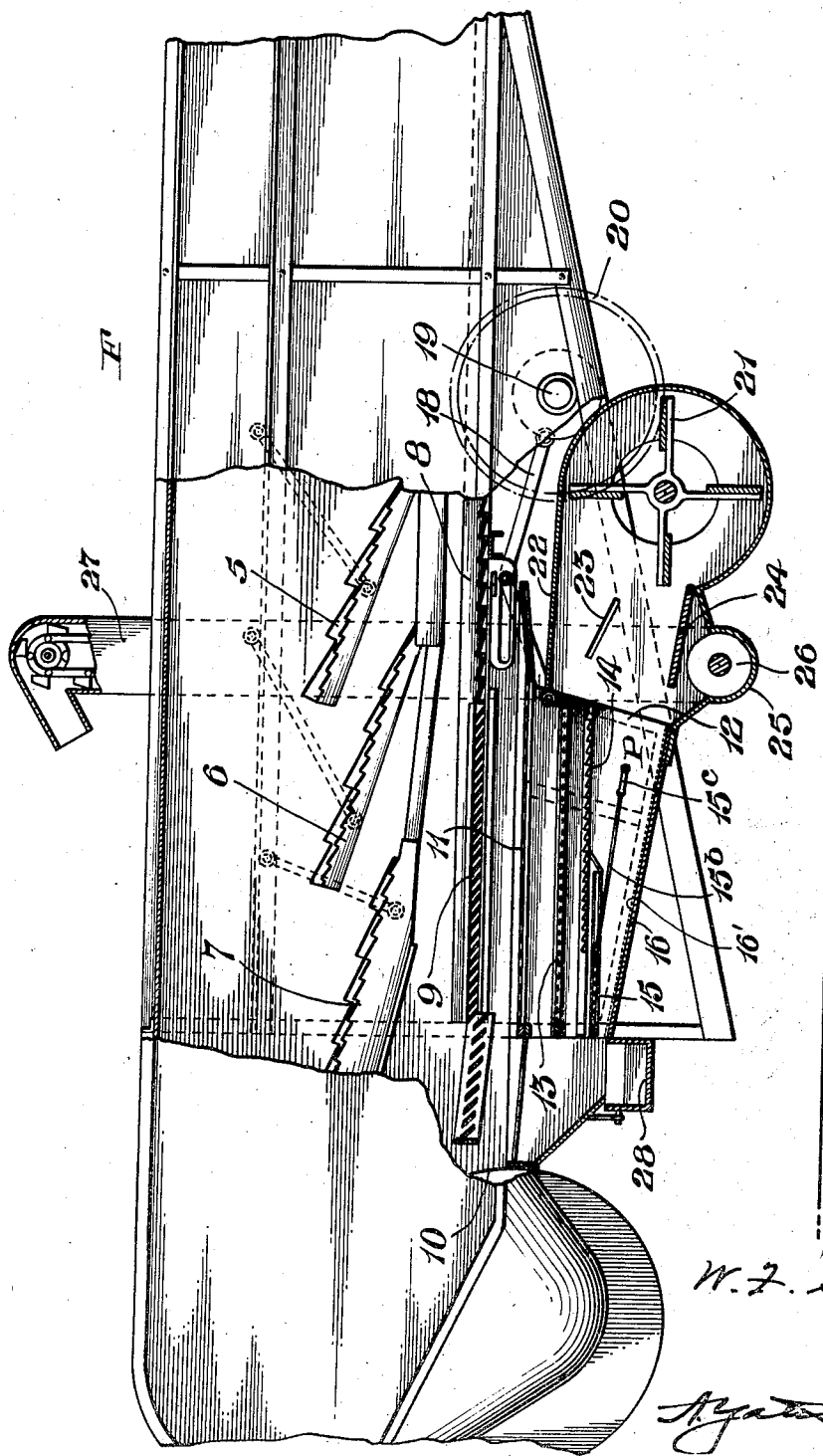

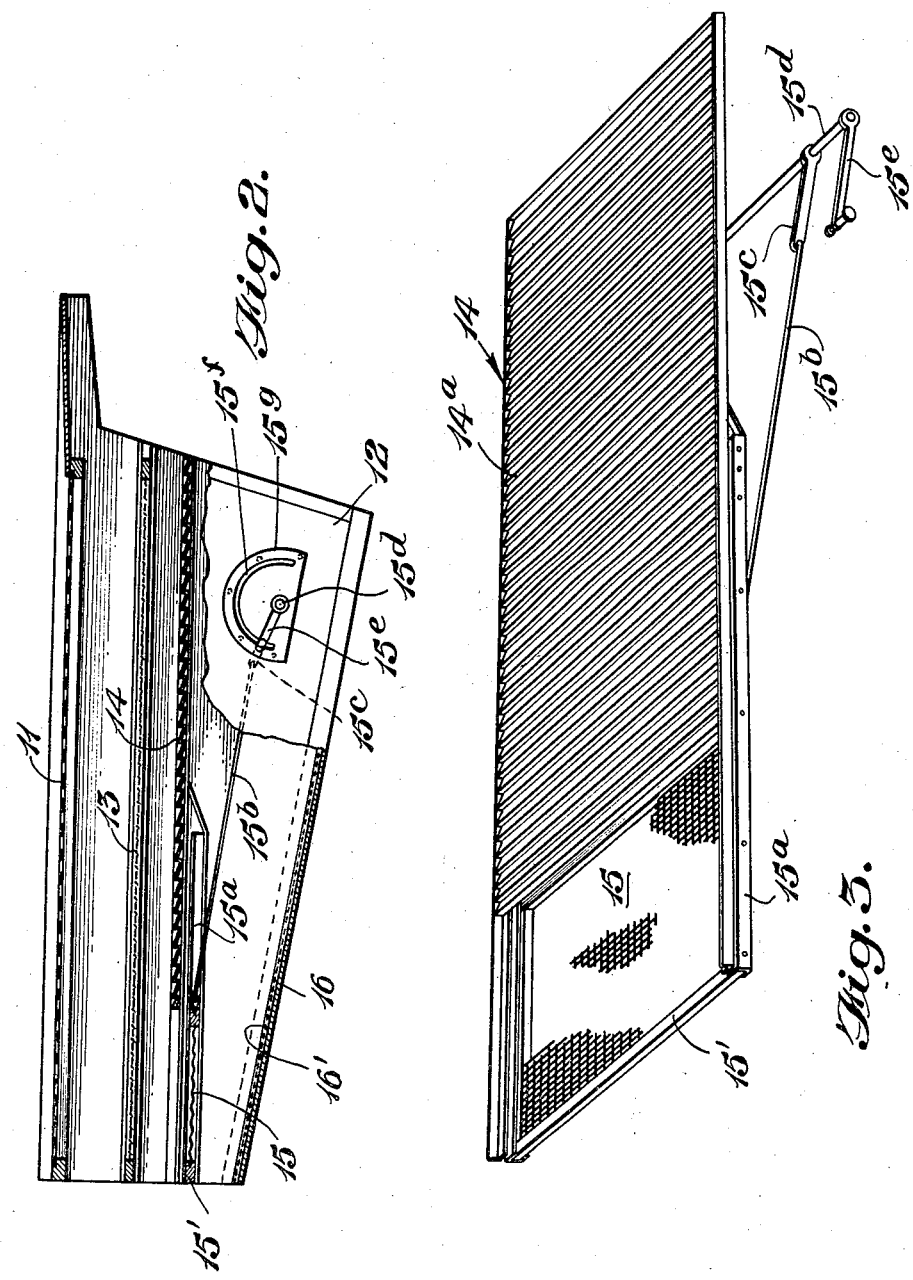

2,186,210

UNITED STATES PATENT OFFICE

2,186,210

GRAIN CLEANER

Wilhalm F. Scheel, Alexandria, Minn., assignor, by direct and mesne assignments, of forty per cent, to Carl J. Newhouse, and twenty per cent to Kenneth H. Dell, both of Alexandria, Minn.

Application October 20, 1937, Serial No. 170,085

2 Claims. (Cl. 209—318)

This invention relates to grain threshers broadly, and is particularly concerned with the grain-cleaning mechanism of such machines wherein the grain, after having been initially separated from the straw and chaff, is subjected to a final sieving and wind blast action.

In threshing machines of the type to which this invention is particularly applicable the threshed grain falls onto a grain pan which progresses it rearwardly and then deposits it on a chaffer, which may be of any suitable type, at which point the major portion of the chaff is removed from the grain, the grain then falling to a cleaning unit comprising a vibrating sieve or sieves and an inclined grain pan therebelow defining a restricted passage or throat therebetween which at its front end is open to the wind blast and its rear or tail end is arranged so that any unthreshed heads, kernels or seed pods are blown or otherwise progressed into a return conveyor or tailing spout, which returns the said unthreshed heads, kernels, or seed pods for an additional threshing and cleaning operation. When the grain passes through the vibrating screen or seive, it falls through the throat of the cleaning unit onto the inclined grain pan, and while so falling, it is subjected to the action of the wind blast, the chaff and other relatively light material being blown outwardly into the blower or stacker.

A difficulty which has been experienced in prior known machines of this type is that in order to effect the most efficient cleaning of the grain, especially when the latter is relatively light, it is ofttimes necessary to step up the wind blast through this throat or passage to a point where a certain percentage of the cleaned grain is forced or carried outwardly into the stacker or blower, resulting in a waste of that portion of the grain. A study of this problem has demonstrated that the reason for this is that the sieved grain is subjected to an inefficient blowing and cleaning action, the grain at the front area of the throat being less dense and receiving the direct force of the wind blast while dropping through the greatest space and that at the rear area of the throat being more dense and receiving the blast as it drops through a relatively short space and impeding the passage of the foreign matter outwardly to the stacker or blower. If the blast is stepped up in an effort to overcome this handicap, the wastage of grain above referred to ensues.

The primary object of the present invention therefore is to render grain separators, including threshing machines, combination grain harvesters and threshers and grain cleaning mills more efficient in the grain cleaning operation, the invention being particularly applicable to the modern type of thresher. More specifically, the invention contemplates means whereby when the grain is subjected to the final sieving and cleaning operation, the most efficient wind blast action may be utilized without danger of loss of cleaned grain while at the same time obtaining maximum cleaning efficiency.

Another object of the invention is to provide an improved type of grain cleaning unit for use in threshing machines, grain combines and cleaning mills which is relatively simple in construction and yet at the same time results in a marked increase in the efficiency of the grain cleaning operation.

A further object is to provide a grain cleaning device for machines of the type specified the use of which will result in a marked improvement in the grain cleaning operation and which may be built and installed as a unit in certain standard types of machines now on the market.

The foregoing and other objects and advantages will become more apparent in view of the following description taken in conjunction with the drawings, wherein:

Figure 1 is a view in section and side elevation of a threshing machine embodying a cleaning unit illustrative of the features of the present invention;

Figure 2 is a detailed view in section and elevation of the improved cleaning unit removed from the machine of Figure 1; and, Figure 3 is a detail view in perspective of a movable grain pan and coacting adjustable mesh sieve forming part of the unit of Figure 2.

Referring to the drawings in detail and first to Figure 1, after the grain has been subjected to the action of the main threshing cylinder and beater, not shown and forming no part of the present invention, grain and straw or chaff is progressed rearwardly on the series of oscillating or vibrating straw beaters and shakers 5, 6, and 7 which are suitably supported by the frame structure of the machine, generally indicated at F. Below these straw beaters and shakers is a main grain pan 8 which receives the grain and chaff therefrom and advances it rearwardly to an adjustable chaffer screen 9, at which point the bulk of the chaff is separated from the grain and is taken into the blower and stacker, the receiving portion of the latter being indicated at 10. Grain falling through the adjustable chaffer screen 9 is deposited on a sieve 11 forming part of the cleaning unit shown in detail in Figure 2 and with which the present invention is particularly concerned. This unit includes a frame 12 which in addition to supporting the screen 11, carries a screen 13, grain-progressing pan 14 with coacting adjustable end sieve 15, and receiving pan 16. The screen 13 and pan 16 together define a main wind blast passageway or throat P which at its draft-receiving end is of maximum depth and becomes gradually restricted as it recedes from said end. This passageway is divided by pan 14 into a supplemental wind blast passageway of substantially the same contour as the main passage but with a solid top wall or roof.

Referring now more particularly to Figures 2 and 3, it will be noted that the pan 14 is disposed immediately beneath the screen 13 and is preferably formed with a plurality of corrugations 14a upon which the grain from the screen 13 drops and is advanced forwardly to the screen 15, the term "forwardly" as used in this instance being applied to the cleaning unit and not to the threshing machine as a whole. This screen, movable or adjustable sieve is mounted in a frame 15' which in turn is mounted to slide in guides 15a. Links 15b are connected at one end to the frame 15' and at their opposite ends are connected to arms 15c secured on a shaft 15d. An adjusting handle 15e is secured on shaft 15d and at its outer end has a guide which rides in an arcuate channel 15f formed in a plate 15g, which may if desired be calibrated to indicate degrees of sliding adjustment of sieve 15. Thus the screen 15 may be readily adjusted with respect to the pan 14.

The entire unit just described including the screens 11 and 13, pan 14 and screen 15 may be shaken through the medium of suitable connections including the arm 18, shaft 19 and drive pulley 20, note Figure 1, or any other suitable connections used on various makes of threshing machines, cleaning mills, for vibrating or shaking their cleaning unit as a whole.

Referring again to Figure 1, it will be noted that the forward end of the unit is disposed with the passage P open to lower the wind blast from fan 21 which is mounted in a housing 22, the latter having associated therewith suitable adjustable vanes or wind-boards 23 and 24 whereby the blast from the fan 21 may be adjusted in direction above and below pan 14 to obtain the most efficient cleaning action. Grain falling on the inclined bottom wall or pan 16 moves forwardly into conveyor housing 25 having mounted therein a screw conveyor 26 which conveys the grain to any suitable point, such as the elevator 27, for weighing and sacking. If desired, a relatively fine screening or dirt sieve 16' may be mounted directly over pan 16.

At the rear end of the unit and preferably connected thereto so as to be vibrated simultaneously therewith is a tailing spout 28 in which unthreshed heads, kernels and seed pods are received and returned for a further rethreshing and cleaning operation.

In operation, the wind boards 23 and 24 are preferably adjusted so that the upper wind current enters the draft-receiving end of the cleaning unit between forward end of grain-progressing pan 14 and rear top end of fan housing 22, passing rearwardly beneath and up through screen and sieves 13 and 11 and through chaffer 9, thus aiding in lifting and separating light chaff and straw from the threshed grain. Grain falling through sieves 11 and 13, except at the forward extremities thereof, is deposited on the pan 14 and is advanced forwardly by the latter to the screen 15. During this period a certain volume of air from the upper wind blast entering cleaning unit between pan 14 and rear upper fan housing 22 is directed through the grain as it is agitated and advanced forwardly by said sieves 11 and 13 and pan 14. When the grain reaches the sieve 15, it drops through the latter (assuming the screen 15 or a certain portion thereof, has been adjusted to receive the grain) and then on to the pan 16. It is at this point that the grain receives the secondary force of the wind blast from the fan 21, but since it falls in sheet form in a limited area of substantially uniform grain density at the point where the blast is concentrated, the wind blast need not be such as to force the grain outwardly into the blower 10 to obtain the desired cleaning action which would be the case if the parts 14 and 15, and notably the part 14, were not present and the grain dropped onto the pan 16 all along the passage P.

While the screen 15 may not be considered essential, yet its use may not only insure a more effective cleaning action but may also serve to more uniformly distribute the falling grain to be acted upon by the wind blast. This screen should be of a mesh permitting passage therethrough of the volume of grain handled consistent with the desired screening action and may be adjusted either to render its full area available, or only a portion thereof. If the screen 15 is adjusted clear of the forward edge of the pan 14, the grain will fall over said edge in a uniform sheet, and this will also be true if the screen is adjusted with just sufficient clearance to accommodate only a portion of the grain, but in the latter instance the sheet will be spread longitudinally of the passage P. As will be obvious, the proper adjustment may be made even while the machine is in operation to obtain the most effective cleaning action from the wind blast.

The screen 15 may be made adjustable to accommodate various types of grain, thereby eliminating the necessity of removing and substituting one screen for another, as would be the case where a screen of fixed or non-adjustable mesh is used.

In actual experience I have found that the spacing between the pan 14 and sieve 15 should receive consideration in order to obtain most efficient results. It will be seen that the wind current will pass through the space or opening between the pan 14 and sieve or screen 15, also through the latter screen, and also through the space between the rear of sieve or screen 15 and return or tailings spout 28. If the sieve or screen 15 is adjusted to its full retracted position, then the current passes through the space between the rear end of pan 14 and tailings spout 28.

Practical experience has shown a marked efficiency in the grain cleaning operation, especially when the grain is relatively light or is not heavy, plump and well formed. While the pan 14 has been shown of corrugated construction, yet it will be understood that the detailed features thereof may be varied within certain limits to obtain the desired grain-advancing operation, and this member as well as the entire unit may be varied and arranged in different spaced relation to obtain the desired results without departing from the spirit of the invention as defined by the appended claims.

I claim:

1. In a grain cleaning machine, means for cleaning thrashed grain including a sieve and an inclined grain-receiving pan disposed therebelow and together with said screen defining a wind blast space of greater depth at one end than at the other, means for creating a wind blast through said space in a direction from the end of the greatest depth towards the shallow end thereof, means located beneath said sieve for receiving the grain therefrom and progressing it to the restricted or shallow end of the space, and means receiving the grain from the discharge end of said progressing means constructed and arranged to spread the grain longitudinally of the space before dropping the grain through said space on to said inclined grain pan, said last named means comprising an additional screen positioned adjacent the discharge end of said grain-receiving and progressing means and receiving grain therefrom, the discharge end of said screen being located intermediate the discharge end of said grain receiving means and the upper end of said inclined pan, and means for slidably adjusting said screen in such a manner as to position its discharge end at varying distances from said receiving and progressing means.

2. In a grain cleaning machine, a grain cleaning shoe or unit comprising a substantially horizontally disposed screen, an inclined grain-receiving floor pan located beneath and spaced from said screen and together with the latter defining a wind blast space of gradually decreasing depth from one end of the shoe to the other, means for creating a wind blast through said space in a direction from the deeper towards the shallower end thereof, a substantially solid grain-progressing pan interposed between the said horizontal screen and the inclined floor pan and operating to receive the grain falling through said screen and progress the grain along and spill it off one end of the grain progressing pan and cause it to fall through the shallow extremity of the wind blast space, and a grain-distributing member coacting with said progressing pan to spread the grain spilling over the discharge end of the latter pan longitudinally of the wind blast space and obtain maximum cleaning efficiency from the wind blast without increasing the force of the latter to a point where it will blow the grain beyond the confines of the shoe, said distributing member comprising an additional screen slidably mounted for movement forwardly and rearwardly in the chute adjacent and beneath the discharge end of said progressing pan and receiving grain therefrom, the discharge end of said additional screen being located intermediate the discharge end of said grain progressing pan and the upper extremity of the inclined floor pan, there being no substantial gap between the additional distributing screen and the discharge end of said latter pan.

WILHALM F. SCHEEL.